United States Patent
Kitano

(10) Patent No.: US 10,106,131 B2
(45) Date of Patent: Oct. 23, 2018

(54) AXLE OF INDUSTRIAL VEHICLE

(71) Applicant: Mitsubishi Nichiyu Forklift Co., Ltd., Kyoto (JP)

(72) Inventor: Seima Kitano, Kyoto (JP)

(73) Assignee: Mitsubishi Logisnext Co., LTD., Kyoto (JP)

( * ) Notice: Subject to any disclaimer, the term of this patent is extended or adjusted under 35 U.S.C. 154(b) by 0 days.

(21) Appl. No.: 15/533,061

(22) PCT Filed: Dec. 25, 2014

(86) PCT No.: PCT/JP2014/084339
§ 371 (c)(1),
(2) Date: Jun. 5, 2017

(87) PCT Pub. No.: WO2016/103399
PCT Pub. Date: Jun. 30, 2016

(65) Prior Publication Data
US 2017/0334411 A1    Nov. 23, 2017

(51) Int. Cl.
*B60T 1/06* (2006.01)
*B60K 17/04* (2006.01)
(Continued)

(52) U.S. Cl.
CPC .............. *B60T 1/062* (2013.01); *B60K 17/04* (2013.01); *B60K 17/165* (2013.01); *B60K 17/28* (2013.01);
(Continued)

(58) Field of Classification Search
CPC ....... B60T 1/062; B60K 17/28; B60K 17/165; B60K 17/356; F16D 55/40; F16D 2121/06; B66F 9/07509
See application file for complete search history.

(56) References Cited

U.S. PATENT DOCUMENTS

| | | | |
|---|---|---|---|
| 2004/0116234 A1* | 6/2004 | Han | B60K 17/02 475/221 |
| 2005/0266951 A1* | 12/2005 | Han | B60K 17/02 475/198 |

(Continued)

FOREIGN PATENT DOCUMENTS

| | | |
|---|---|---|
| JP | 07-208512 | 8/1995 |
| JP | 2003-247573 | 9/2003 |

(Continued)

OTHER PUBLICATIONS

International Search Report in corresponding international application No. PCT/JP2014/084339, dated Feb. 10, 2015.

*Primary Examiner* — James A English
(74) *Attorney, Agent, or Firm* — Kirschstein, Israel, Schiffmiller & Pieroni, P.C.

(57) ABSTRACT

An axle of an industrial vehicle, in which a parking brake can be maintained easily. The parking brake is arranged adjacent to a power transmission device outside an axle housing. The parking brake includes a brake housing, a brake shaft supported rotatably around the axis of the brake housing, a brake gear attached to the brake shaft and meshed with a transmission gear, first brake plates attached to the brake shaft, second brake plates attached to the brake housing and alternately arranged with the first brake plates, and a brake piston arranged so as to move toward and away from the plates and in the brake housing for bringing the plates into pressure contact with each other.

7 Claims, 5 Drawing Sheets

(51) Int. Cl.
  *B66F 9/075* (2006.01)
  *F16D 55/40* (2006.01)
  *B60K 17/16* (2006.01)
  *B60K 17/28* (2006.01)
  *F16D 121/06* (2012.01)

(52) U.S. Cl.
  CPC ............... *B60T 1/06* (2013.01); *B66F 9/075* (2013.01); *B66F 9/07509* (2013.01); *F16D 55/40* (2013.01); *F16D 2121/06* (2013.01)

(56) References Cited

U.S. PATENT DOCUMENTS

2009/0252586 A1* 10/2009 Sumiyoshi .............. B60T 1/062
  414/685
2009/0312133 A1* 12/2009 Han ........................ B60T 7/122
  475/144
2013/0146384 A1* 6/2013 Hirashita ................ B60T 1/062
  180/307

FOREIGN PATENT DOCUMENTS

| JP | 2003-343622 | 12/2003 |
| JP | 2005-263140 | 9/2005 |
| JP | 2006-298273 | 11/2006 |
| JP | 2012-51442 | 3/2012 |

\* cited by examiner

AXLE OF INDUSTRIAL VEHICLE

TECHNICAL FIELD

The present invention relates to an axle of an industrial vehicle provided with a parking brake.

BACKGROUND ART

In some industrial vehicles such as a forklift, wet multiple disc brakes are adopted as a service brake and a parking brake of an axle. By adopting a wet multiple disc brake, the service life of the brake can be extended. Axles of this type are disclosed in, for example, Patent Literatures 1 and 2.

FIG. 4 is a partial sectional view of an axle of an industrial vehicle disclosed in Patent Literature 1. FIG. 5 is a view taken along the line A-A of FIG. 4. The axle comprises an axle housing 6, an axle shaft 60 inserted in the axle housing 6, and a frame support 61 arranged around an outer periphery of the axle shaft 60. An inner diameter portion of the frame support 61 is fixed to a flange portion 6a of the axle housing 6 with bolts 62, and an outer diameter portion of the frame support 61 is fixed to a frame 63 of the body with bolts 64.

A wheel hub 65 is arranged on the outer periphery of the axle housing 6 via bearings 66. One end of the wheel hub 65 is fixed to a flange end portion 60a of the axle shaft 60 with bolts 67, and the other end of the wheel hub 65 is fixed to a brake hub 68 and a rim 69 of a wheel with bolts 70. A brake cover 71 and a center cover 72 are fixed to the frame support 61 with bolts 73.

Friction plates 74 are engaged with splines of the brake hub 68 so as to be movable in the axial direction of the axle shaft 60. Mating plates 75 are engaged with splines of the center cover 72 so as to be movable in the axial direction of the axle shaft 60. The friction plates 74 and the mating plates 75 are alternately arranged in the axial direction of the axle shaft 60.

A parking piston 76 is arranged inside the frame support 61 so as to be movable in the axial direction of the axle shaft 60. Parking springs 77 are arranged between the parking piston 76 and the frame support 61. Service pistons 78 are housed in the frame support 61 so as to be movable in the axial direction of the axle shaft 60. As shown in FIG. 5, the service pistons 78 and the parking springs 77 are arranged in a circumferential direction around an axial center 600 of the axle shaft 60. An oil chamber 79 is provided for the parking piston 76. An oil chamber 80 is provided for each of the service pistons 78.

In order to operate the parking brake, an oil feeding/discharging device (not shown) discharges the hydraulic oil from each of the oil chambers 80 through an oil passage 81 and an outlet 82 (see FIG. 5), and discharges the hydraulic oil from the oil chamber 79 through an oil passage 83. Then, the parking piston 76 is pressed against both the plates 74 and 75 by the biasing force of the parking springs 77, and thereby the plates 74 and 75 are brought into pressure contact with each other. As a result, rotation of the wheel is blocked. In order to release the parking brake, the oil feeding/discharging device supplies the hydraulic oil to the oil chamber 79 through the oil passage 83 to move the parking piston 76 away from the plates 74 and 75 against the biasing force of the parking springs 77. Thereby, the pressure contact between the plates 74 and 75 is released.

In order to operate the service brake, the parking brake is released in advance as described above. The oil feeding/discharging device supplies the hydraulic oil to each of the oil chambers 80 through an inlet 84 (see FIG. 5) and the oil passage 81. Then, the service pistons 78 are pressed against the plates 74 and 75, and thereby the plates 74 and 75 are brought into pressure contact with each other. As a result, the wheel is braked.

As described above, in this axle, the parking brake and the service brake are integrated and share the friction plates 74 and the mating plates 75.

CITATION LIST

Patent Literatures

[Patent Literature 1] Japanese Patent Laid-Open No. 2003-343622
[Patent Literature 2] Japanese Patent Laid-Open No. 2003-247573

SUMMARY OF INVENTION

Technical Problem

However, such a brake structure is very complicated and must be arranged on both right and left sides of the axle, and thereby the cost is high.

Moreover, it is not easy to maintain this brake structure. For example, an operator can maintain the friction plates 74, the mating plates 75, the parking piston 76, the parking springs 77, and the service pistons 78 only after detaching the axle shaft 60, the wheel, the wheel hub 65, the brake hub 68, and the brake cover 71 in sequence. Further, as shown in FIG. 5, the parking springs 77 and the service pistons 78 are arranged around the axle shaft 60, which is one of the grounds for poor accessibility.

Further, in this brake structure, since the parking brake is a negative brake, it must be released when the industrial vehicle is towed in an emergency. To release the parking brake, it is necessary to operate brake release bolts (not shown) arranged around the axial center 600. Therefore, an operator must access the respective brake release bolts in the right and left brake structures from the inside of the lower part of the axle housing 6. Like this, it is also not easy to release the parking brake by the brake release bolts.

The present invention has been made in view of the situation described above. An object of the present invention is to provide an axle of an industrial vehicle in which a parking brake can be maintained easily.

Solution to Problem

In order to solve the problem described above, an axle of an industrial vehicle according to the present invention is an axle comprising an axle housing, a right and left pair of axle shafts inserted in the axle housing, a differential gear device arranged in the axle housing and configured to distribute power generated by a power source to the pair of axle shafts, a power transmission device arranged outside the axle housing and configured to transmit the power to the differential gear device, and a parking brake arranged adjacent to the power transmission device outside the axle housing. The power transmission device includes a transfer housing, a transmission shaft supported rotatably around its axis by the transfer housing to transmit the power to the differential gear device, and a transmission gear mounted on the transmission shaft and rotated by the power. The parking brake includes a brake housing, a brake shaft supported rotatably around its axis by the brake housing, a brake gear mounted on the brake shaft and meshed with the transmission gear, first brake plates attached to the brake shaft, second brake plates attached to the brake housing and alternately arranged with the first brake plates, and a brake piston arranged in the brake housing so as to move toward and away from the first brake plates and the second brake plates for bringing the first brake plates and the second brake plates into pressure contact with each other.

It is preferable that the parking brake further includes a spring arranged in the housing to press the brake piston against the first brake plates and the second brake plates, and that when hydraulic oil is supplied to an oil chamber in the brake housing, the brake piston is moved away from the first brake plates and the second brake plates against biasing force of the spring, and thereby the pressure contact between the first brake plates and the second brake plates is released.

It is preferable that the parking brake further includes a brake release bolt extending from the inside to the outside of the brake housing and screw-engaged with the brake piston, and that the brake piston is moved away from the first brake plates and the second brake plates against the biasing force of the spring by the rotation of the brake release bolt, and thereby the pressure contact between the first brake plates and the second brake plates is released.

It is preferable that the parking brake is arranged adjacent to the right side of the power transmission device, and is located away from the center axis of the body of the industrial vehicle in the right direction when the axle is attached to the body.

It is preferable that the parking brake is arranged adjacent to the left side of the power transmission device, and is located away from the center axis of the body of the industrial vehicle in the left direction when the axle is attached to the body.

It is preferable that the axle further includes service brakes arranged on both right and left sides of the axle housing, and that each of the service brakes is a drum brake.

The industrial vehicle may be a forklift including an engine as the drive source.

The axle may be a front axle attached to a front part of a body of the industrial vehicle.

Advantageous Effects of Invention

According to the present invention, it is easy to access the parking brake from a side of the body. Therefore, maintenance of the parking brake, for example replacement of components such as brake plates and a brake piston can be performed easily.

DESCRIPTION OF EMBODIMENT

Hereinafter, an axle of an industrial vehicle according to an embodiment of the present invention will be described with reference to the drawings. An axle is attached to a body of an industrial vehicle such as a forklift. In the embodiment, the industrial vehicle is a forklift having an engine as a drive source, and the axle is a front axle attached to a front part of the body of the industrial vehicle.

Figure 1:
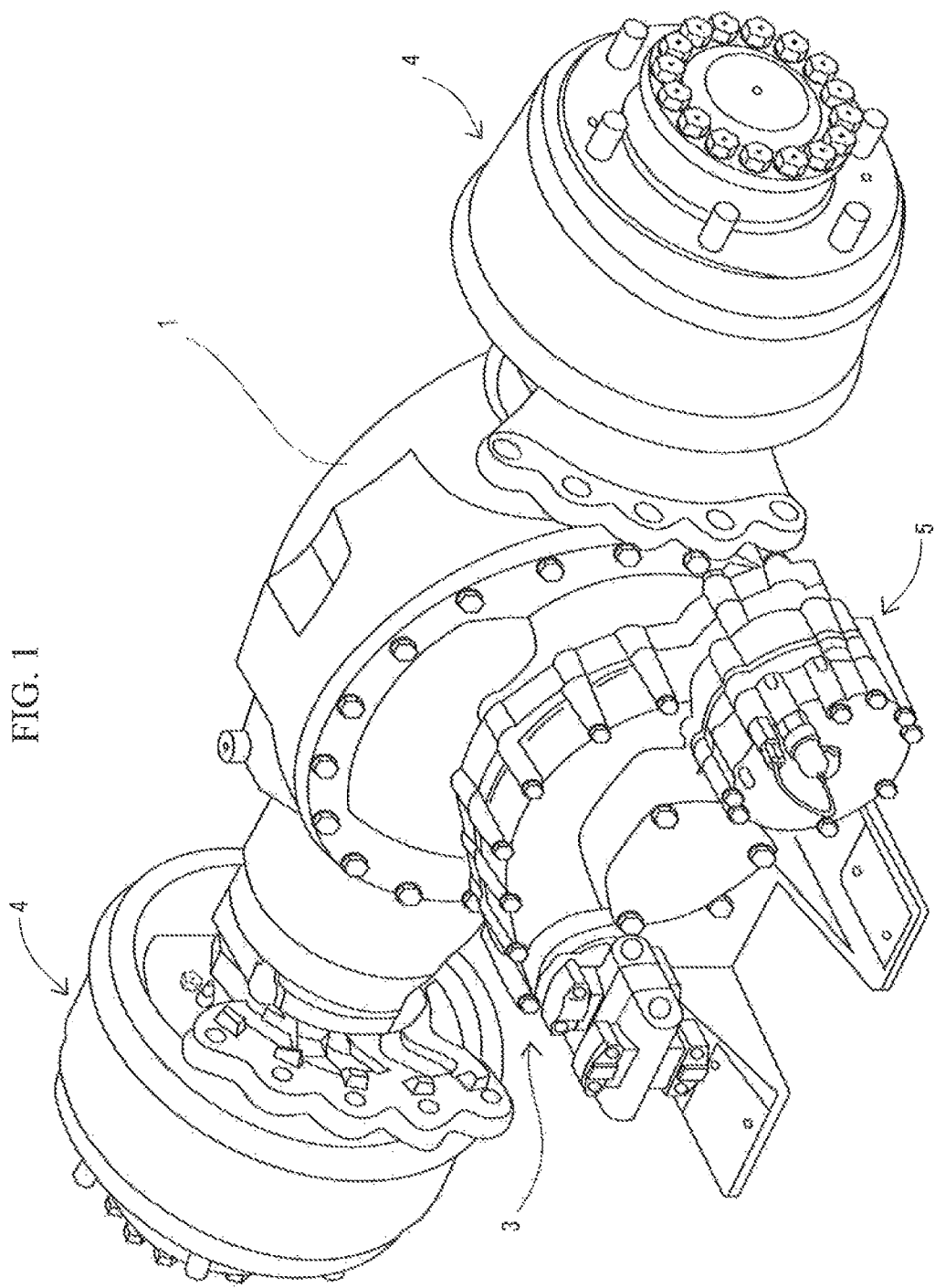
FIG. 1 is a schematic perspective view of an axle according to an embodiment of the present invention.
Figure 2:
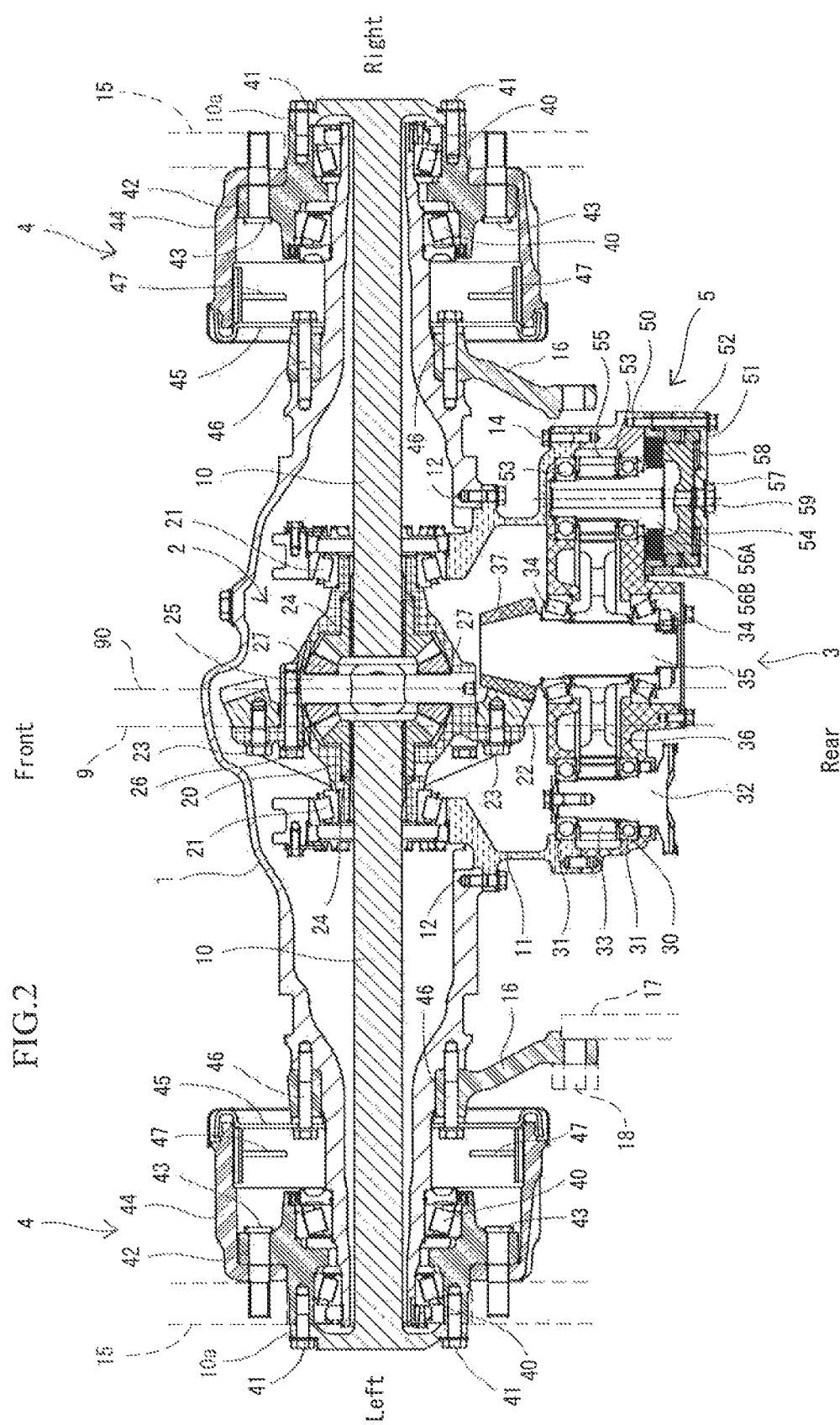
FIG. 2 is a cross-sectional view of an axle according to an embodiment of the present invention.

FIG. 1 illustrates a schematic perspective view of the axle according to the embodiment. FIG. 2 illustrates a cross-sectional view of the axle of FIG. 1. The axle comprises an axle housing 1, and a right and left pair of axle shafts 10 inserted in the axle housing 1 and extending in a right and left direction.

The axle further comprises a differential gear device 2 configured to distribute and transmit the power generated by the engine (not shown) to the pair of axle shafts 10, and a power transmission device 3 configured to transmit the power from the engine to the differential gear device 2.

The differential gear device 2 is arranged in the center of the axle housing 1. A differential housing 20 is rotatably supported by the axle housing 1 via bearings 21. An input gear 22 has a ring shape and is fixed on the outer periphery of the differential housing 20 with bolts 23 to rotate integrally with the differential housing 20. The power from the engine is transmitted to the input gear 22 via the power transmission device 3. A right and left pair of output gears 24 (side gears) is arranged in the differential housing 20. Each axle shaft 10, at its inner end portion, is attached to the output gear 24 to rotate integrally with output gear 24.

A pinion shaft 25 is fixed to the differential housing 20 with a pin 26 and extends perpendicular to the axle shaft 10. A pair of pinion gears 27 is mounted rotatably with respect to the pinion shaft 25 on both ends of the pinion shaft 25. Each of the pinion gears 27 is meshed with the output gears 24.

Figure 3:
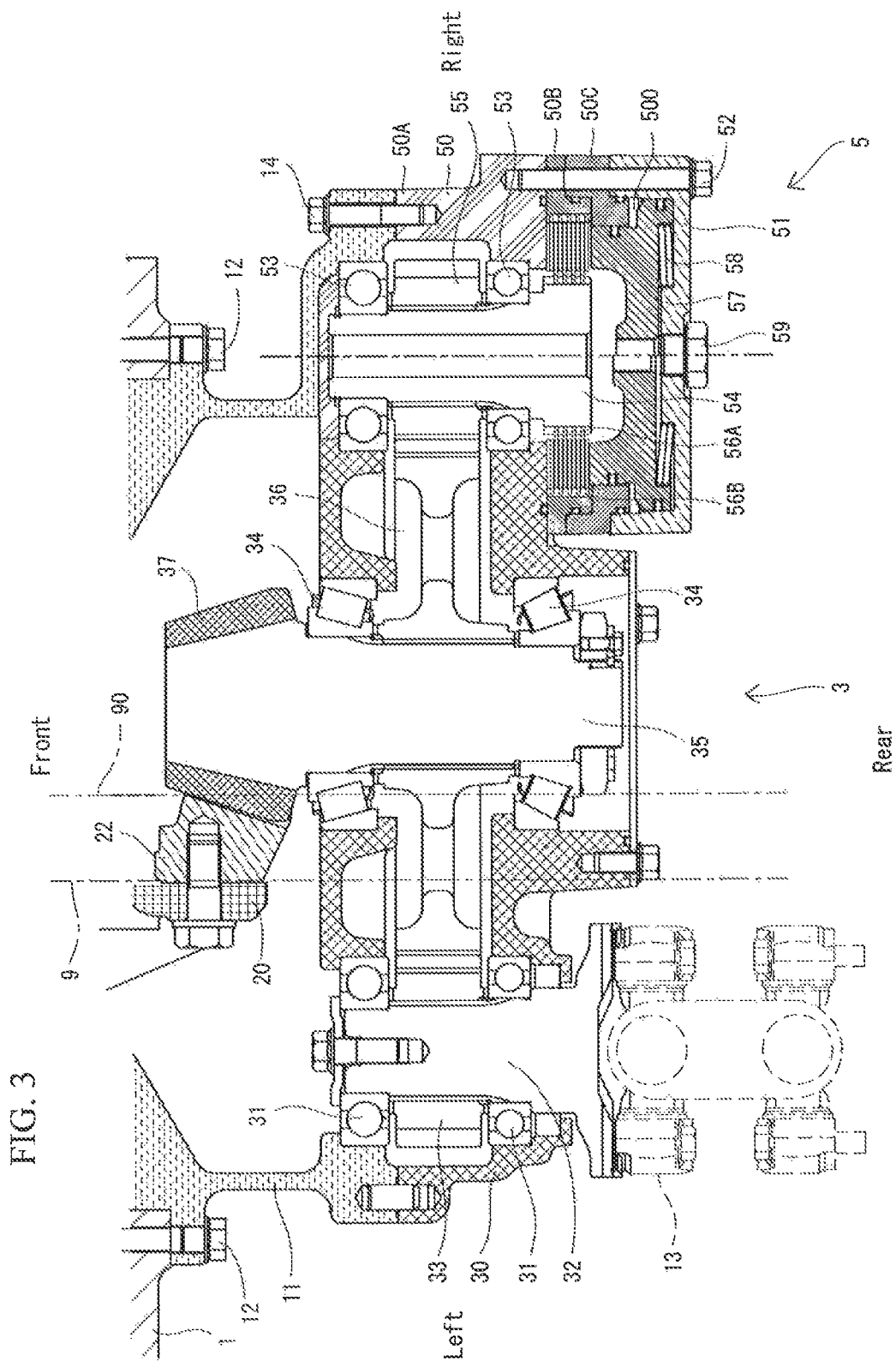
FIG. 3 is a partial enlarged cross-sectional view of an axle according to an embodiment of the present invention.

Referring to FIGS. 2 and 3, the power transmission device 3 is arranged behind the differential gear device 2 outside the axle housing 1. The power transmission device 3 includes a transfer housing 30. A support 11 is fixed to the circumference of the center opening of the axle housing 1 with bolts 12, and the transfer housing 30 is fixed to the support 11 with bolts.

The power transmission device 3 further includes an input shaft 32 supported rotatably about its axis by the transfer housing 30 via bearings 31 and extending perpendicular to the right and left direction, and an input gear 33 mounted on the input shaft 32 to rotate integrally with the input shaft 32. The input shaft 32 is connected to an output shaft of a transmission (not shown) via a universal joint 13 (see FIG. 3). The power from the engine is transmitted to the input shaft 32 via the transmission.

The power transmission device 3 further includes a transmission shaft 35 supported rotatably around its axis by the transfer housing 30 via bearings 34 and extending perpendicular to the right and left direction, in order to transmit the power from the input shaft 32 to the differential gear device 2. The power transmission device 3 further includes a transmission gear 36 mounted on the transmission shaft 35 to rotate integrally with the transmission shaft 35. An output gear 37 is formed at an end of the transmission shaft 35 and is meshed with the input gear 22 of the differential gear device 2. The transmission gear 36 is meshed with the input gear 33, and is rotated by the power transmitted via the input shaft 32 and the input gear 33.

When the power is transmitted from the engine to the input shaft 32 via the transmission, the input shaft 32 and the input gear 33 are rotated integrally, and thereby the transmission shaft 35 and the transmission gear 36 are rotated integrally. As a result, the input gear 22 of the differential gear device 2, meshed with the output gear 37 of the transmission shaft 35, is rotated. In this way, the power transmission device 3 transmits the power from the engine to the differential gear device 2. When the input gear 22 of the differential gear device 2 is rotated, both of the output gears 24 are rotated by the differential housing 20, the pinion shaft 25, and the pinion gears 27. As a result, the respective axle shafts 10 are rotated. In this way, the differential gear device 2 distributes and transmits the power to the pair of axle shafts 10.

Referring to FIGS. 1 and 2, the axle further comprises two service brakes 4 configured to brake rotation of the wheels on both right and left sides of the axle when the industrial vehicle is traveling, and a parking brake 5 configured to block rotation of the wheels when the industrial vehicle is parked.

Referring to FIG. 2, in the embodiment, each of the service brake 4 is a dry drum brake. The service brakes 4 are arranged on both right and left sides of the axle housing 1. Each of the service brakes 4 includes a wheel hub 42 arranged on the outer periphery of the axle housing 1 via bearings 40 and fixed to a flange-shaped outer end portion 10*a* of the axle shaft 10 with bolts 41. Each of the service brakes 4 further includes a brake drum 44 arranged around the outer periphery of the axle housing 1 and fixed to the wheel hub 42 with bolts 43. A rim 15 of the wheel is fixed to the wheel hub 42 and the brake drum 44 with the bolt 43.

Each of the service brakes 4 further includes a back plate 45 that covers the inner opening of the brake drum 44. Both the back plate 45 and the frame support 16 are fixed to the axle housing 1 with bolts 46. The frame support 16 is attached to a frame 17 of the body of the industrial vehicle with bolts 18. Thereby, the axle is attached to the body.

Each of the service brakes 4 further includes a pair of brake shoes 47 arranged inside the brake drum 44, and a wheel cylinder (not shown) supported by the back plate 45.

When the pair of brake shoes 47 is pressed against the inner wall of the brake drum 44 by the wheel cylinder, rotation of the wheel is braked. In this way, the service brake 4 brakes rotation of the wheel when the industrial vehicle is travelling.

Referring to FIG. 3, the parking brake 5 is a wet multiple disc brake and is also a negative brake. The parking brake 5 is arranged adjacent to the right side of the power transmission device 3 outside the axle housing 1, and is located on the lower right side of the body. This means that the parking brake 5 is located away from the center axis 9 of the body in the right direction when the axle is attached to the body. A reference numeral 90 in FIGS. 2 and 3 denotes the center axis of the axle.

The parking brake 5 includes a brake housing 50. The brake housing 50 is fixed to the support 11 with bolts 14. The brake housing 50 consists of a combination of a plurality of frames (first frame 50A, second frame 50B, and third frame 50C). The brake housing 50 has an opening facing in a direction away from the axle housing 1 (facing rearward in the embodiment). The opening is covered with a brake cover 51. The brake housing 50 and the brake cover 51 are fixed with each other with bolts 52.

The parking brake 5 further includes a brake shaft 54 supported rotatably around its axis by the first frame 50A of the brake housing 50 via a bearing 53 and extending perpendicular to the right and left direction. The brake shaft 54 is in parallel with the input shaft 32 and the transmission shaft 35 of the power transmission device 3. The brake shaft 54 is located across the transmission shaft 35 from the input shaft 32. The parking brake 5 further includes a brake gear 55 mounted on the brake shaft 54 to rotate integrally with the brake shaft 54. The brake gear 55 has an outer diameter that is the same as the outer diameter of the input gear 33 of the power transmission device 3. The transfer housing 30 and the brake housing 50 communicate with each other, and the brake gear 55 is meshed with the transmission gear 36.

The parking brake 5 further includes a plurality of first brake plates 56A (friction plates) attached to the brake shaft 54 to rotate integrally with the brake shaft 54, and a plurality of second brake plates 56B (mating plates) attached to the brake housing 50 not to rotate integrally with the brake shaft 54. Each of the first brake plates 56A and the second brake plates 56B has a ring shape. The first brake plates 56A are engaged with the splines formed on the outer periphery of the brake shaft 54 so as to be movable the axial direction of the brake shaft 54. The second brake plates 56B are engaged with the splines formed on the inner periphery of the second frame 50B of the brake housing 50 so as to be movable in the axial direction of the brake shaft 54. The first brake plate 56A and the second brake plate 56B are arranged alternately in the axial direction of the brake shaft 54.

The parking brake 5 further includes a brake piston 57 for bringing the first brake plate 56A and the second brake plate 56B into pressure contact with each other. The brake piston 57 is arranged in the brake housing 50 so as to move toward and away from the first brake plates 56A and the second brake plates 56B in the axial direction of the brake shaft 54.

The parking brake 5 further includes a spring 58 arranged in the brake housing 50. The spring 58 is arranged between the brake piston 57 and the brake cover 51 in a compressed state to presses the brake piston 57 against the first brake plates 56A and the second brake plates 56B with its biasing force.

Further, in the brake housing 50, an oil chamber 500 is provided for releasing the parking brake 5. The oil chamber 500 is formed by the brake piston 57, the third frame 50C, and a cover 51. By an oil feeding/discharging device (not shown), hydraulic oil is supplied to the oil chamber 500 through an oil passage and is discharged from the oil chamber 500.

The parking brake 5 is provided with a brake release bolt 59 for releasing the parking brake 5 in an emergency. The brake release bolt 59 extends perpendicular to the right and left direction and penetrates the brake cover 51, and slightly protrudes to the outside of the brake housing 50 in a direction separating from the axle housing 1 (rearward in the embodiment). The brake release bolt 59 is screw-engaged with the brake piston 57.

Operation and release of the parking brake 5 will be described below. The brake piston 57 is normally pressed against the first brake plates 56A and the second brake plates 56B by the biasing force of the spring 58, and thereby the first brake plates 56A and the second brake plates 56B are brought into pressure contact with each other (see left half of the parking brake 5 in FIG. 3). With the pressure contact, rotation of the brake shaft 54 and the brake gear 55 is blocked. At the same time, since the transmission gear 36 of the power transmission device 3 is meshed with the brake gear 55, rotation of the transmission shaft 35 and the transmission gear 36 is blocked. Thereby, rotation of the axle shaft 10 is blocked. As a result, rotation of the wheel is blocked. The parking brake 5 operates in this manner to block rotation of the wheel when the industrial vehicle parks.

When the hydraulic oil is supplied to the oil chamber 500 by the oil feeding/discharging device, the brake piston 57 is moved away from the first brake plates 56A and the second brake plates 56B against the biasing force of the spring 58, and thereby the pressure contact between the first brake plates 56A and the second brake plates 56B is released (see right half of the parking brake 5 in FIG. 3). As a result, the wheel becomes rotatable. The parking brake 5 is released in this manner.

As the parking brake 5 is a negative brake, it operates even when the engine is stopped. In order to tow the industrial vehicle in an emergency, it is necessary to release the parking brake 5. In that case, an operator accesses the parking brake 5 from a side (right side in the embodiment) of the body, and rotates the brake release bolt 59 using a tool such as a wrench. By the rotation of the brake release bolt 59, the brake piston 57 screw-engaged with the brake release bolt 59 is moved relative to the brake release bolt 59 and is also moved away from the first brake plates 56A and the second brake plates 56B against the biasing force of the spring 58. Thereby, the pressure contact between the first brake plates 56A and the second brake plates 56B is released. In this way, the parking brake 5 is also released by the brake release bolt 59.

As described above, the parking brake 5 is a wet multiple disc brake. The parking brake 5 is arranged adjacent to the power transmission device 3 outside the axle housing 1 in such a manner that the brake gear 55 thereof are meshed with the transmission gear 36 of the power transmission device 3. With this arrangement, it is easy to access the parking brake 5 from a side (left side or right side) of the body. Therefore, maintenance of the parking brake 5 such as replacement of the brake plates 56A and 56B and seals of the brake piston 57 can be performed easily. Regarding the axle in the embodiment, it is clear that the accessibility and the maintenance performance with respect to the parking brake 5 are superior, compared with the brake structure of a conventional axle shown in FIGS. 4 and 5.

Figure 4:
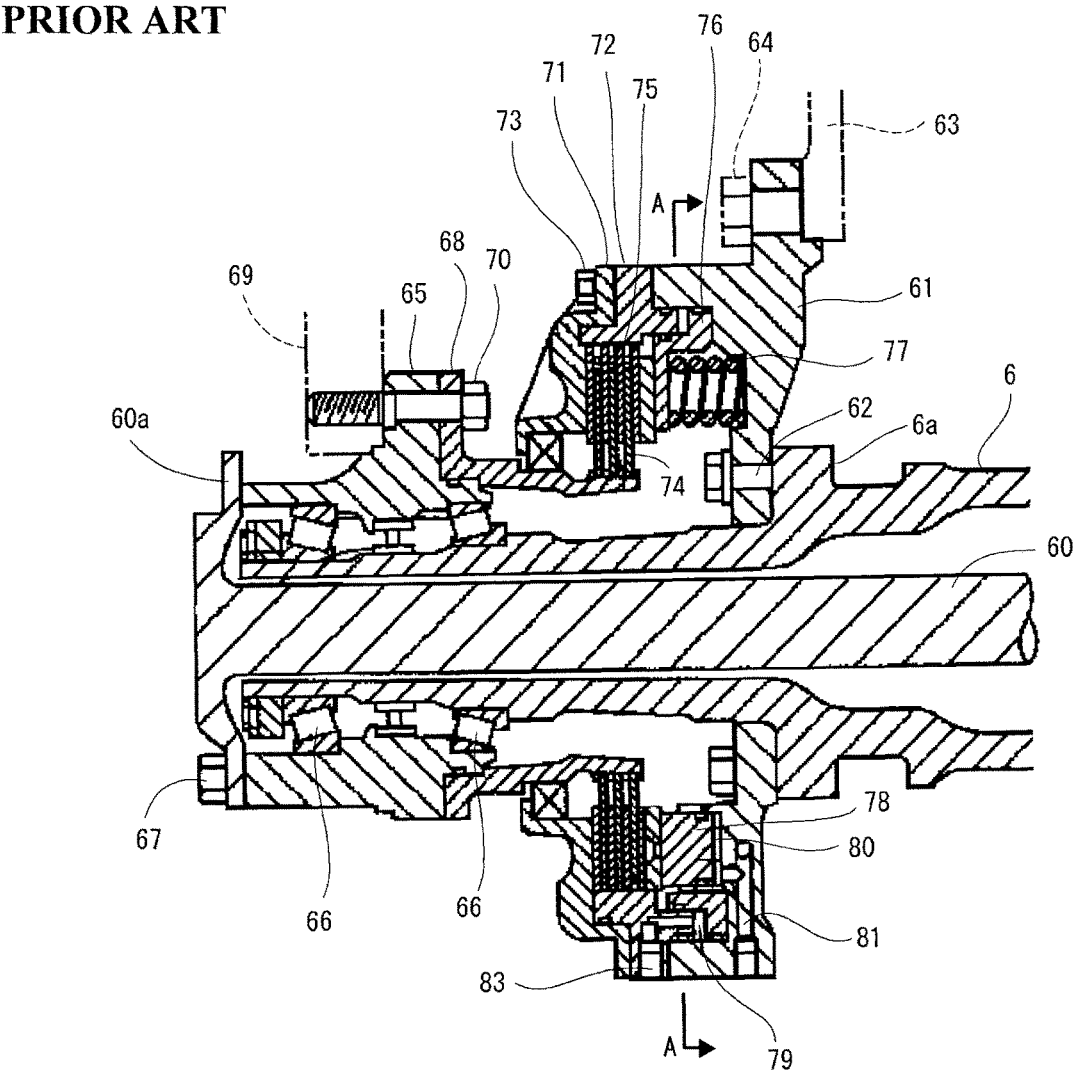
FIG. 4 is a cross-sectional view of a conventional front axle.
Figure 5:
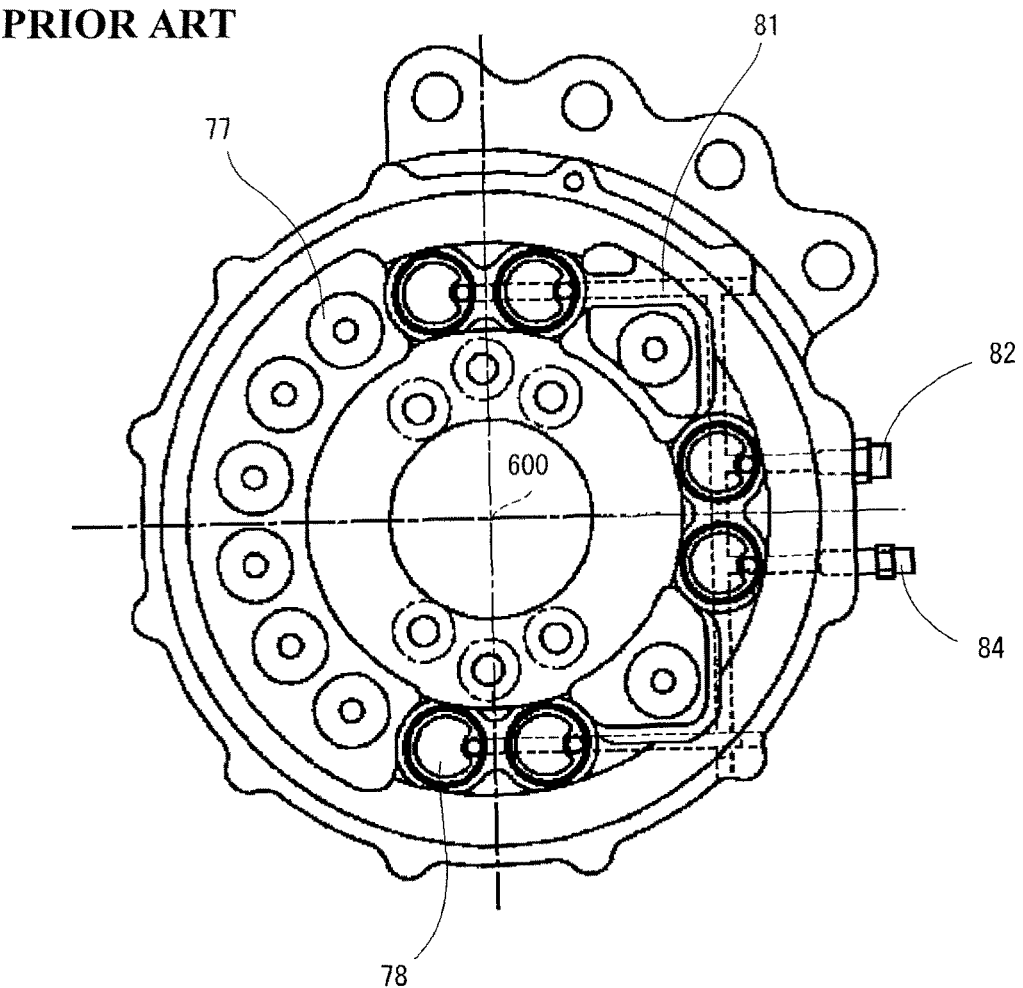
FIG. 5 is a view taken along a line A-A of FIG. 4.

Moreover, according to the axle shown in FIGS. 4 and 5, it is necessary to arranged parking brakes on both right and left sides. Meanwhile, according to the axle of the present embodiment, one parking brake 5 is enough. Thereby, the cost can be reduced.

The parking brake 5 is a negative brake. In order to tow the industrial vehicle in an emergency, it is necessary to release the parking brake 5 by the brake release bolt 59. Since it is easy to access the parking brake 5 from a side of the body as described above, the parking brake 5 can be released easily by the brake release bolt 59. In the conventional axle shown in FIGS. 4 and 5, it is necessary to arrange a plurality of brake release bolts around the axle shaft 60 because of the brake structure. Meanwhile, in the axle of the present embodiment, it is enough that one brake release bolt 59 is arranged at the center of the parking brake 5. This makes it easier to release the parking brake 5 at the time of emergency.

Further, in the embodiment, the parking brake 5 is arranged adjacent to the right side of the power transmission device 3, and is located away from the center axis 9 of the body in the right direction when the axle is attached to the body. Thereby, it is easier to access the parking brake 5 from the right side of the body. Instead, the parking brake 5 may be arranged adjacent to the left side of the power transmission device 3 and may be located away from the center axis 9 of the body in the left direction when the axle is attached to the body. With this configuration, it is easier to access the parking brake 5 from the left side of the body.

Since arrangement of the parking brake 5 can be achieved only by meshing the brake gear 55 with the transmission gear 36 of the existing power transmission device 3, a complicated configuration is not required. Therefore, the number of components can be reduced, and thereby the cost can be reduced.

According to the brake structure of the conventional axle shown in FIGS. 4 and 5, since the brake plates 74 and 75 are shared by the parking brake and the service brake, the heating value is high. Therefore, cooling oil for the brake structure and cooling oil for the differential gear device are used separately. On the other hand, according to the axle of the embodiment, since the brake plates 56A and 56B are used only for the parking brake 5, the heating value is low. Therefore, cooling oil can be shared by the parking brake 5 and the differential gear device 2.

The service brake 4 may be a wet brake instead of a dry brake. Further, the transfer housing 30 and the brake housing 50 may be formed integrally.

REFERENCE SIGNS LIST 1 axle housing
10 axle shaft
2 differential gear device
3 power transmission device
30 transfer housing
35 transmission shaft
36 transmission gear
37 output gear
4 service brake
5 parking brake
50 brake housing
500 oil chamber
54 brake shaft
55 brake gear
57 brake piston
58 spring
59 brake release bolt
9 center axis of body

The invention claimed is:

1. An axle of an industrial vehicle, the axle comprising:
an axle housing;
a right and left pair of axle shafts inserted in the axle housing;
a differential gear device arranged in the axle housing and configured to distribute power generated by a drive source to the pair of axle shafts;
a power transmission device arranged outside the axle housing and configured to transmit the power to the differential gear device; and
a parking brake arranged adjacent to the power transmission device outside the axle housing, the parking brake being a negative brake,
the power transmission device including:
a transfer housing;
a transmission shaft supported rotatably around an axis extending along the transmission shaft by the transfer housing to transmit the power to the differential gear device; and
a transmission gear mounted on the transmission shaft and rotated by the power,
the parking brake including;
a brake housing having an opening facing in a direction away from the axle housing;
a brake cover covering the opening;
a brake shaft supported rotatably around an axis extending along the brake shaft by the brake housing;
a brake gear mounted on the brake shaft and meshed with the transmission gear;

first brake plates attached to the brake shaft;
second brake plates attached to the brake housing, the first brake plates and the second brake plates being arranged alternately in an axial direction of the brake shaft;
a brake piston arranged in the brake housing so as to move toward and away from the first brake plates and the second brake plates in the axial direction of the brake shaft for bringing the first brake plates and the second brake plates into pressure contact with each other; and
a spring arranged between the brake piston and the brake cover in the brake housing to press the brake piston against the first brake plates and the second brake plates, wherein
a brake release bolt is arranged at a center of the parking brake, penetrates the brake cover, and is screw-engaged with the brake piston, and
the brake piston is moved away from the first brake plates and the second brake plates against a biasing force of the spring by rotation of the brake release bolt, and thereby the pressure contact between the first brake plates and the second brake plates is released.

2. The axle of the industrial vehicle according to claim 1, wherein when hydraulic oil is supplied to an oil chamber in the brake housing, the brake piston is moved away from the first brake plates and the second brake plates against the biasing force of the spring, and thereby the pressure contact between the first brake plates and the second brake plates is released.

3. The axle of the industrial vehicle according to claim 1, wherein the parking brake is arranged adjacent to a right side of the power transmission device, and is located away from a center axis of a body of the industrial vehicle in a right direction when the axle is attached to the body.

4. The axle of the industrial vehicle according to claim 1, wherein the parking brake is arranged adjacent to a left side of the power transmission device, and is located away from a center axis of a body of the industrial vehicle in a left direction when the axle is attached to the body.

5. The axle of the industrial vehicle according to claim 1, further comprising service brakes arranged on both right and left sides of the axle housing, wherein each of the service brakes is a drum brake.

6. The axle of the industrial vehicle according to claim 1, wherein the industrial vehicle is a forklift including an engine as the drive source.

7. The axle of the industrial vehicle according to claim 1, wherein the axle is a front axle attached to a front part of a body of the industrial vehicle.

* * * * *